United States Patent [19]
Burow et al.

[11] Patent Number: 6,086,846
[45] Date of Patent: *Jul. 11, 2000

[54] USE OF SYNTHETIC, IRON RAW MATERIALS FOR PREPARING IRON OXIDE PIGMENTS

[75] Inventors: Wilfried Burow; Wolfgang Oehlert; Ulrike Pitzer; Heribert Bade, all of Krefeld, Germany

[73] Assignee: Bayer AG, Leverkusen, Germany

[ * ] Notice: This patent is subject to a terminal disclaimer.

[21] Appl. No.: 09/164,039

[22] Filed: Sep. 29, 1998

Related U.S. Application Data

[63] Continuation of application No. 08/805,223, Feb. 24, 1997, Pat. No. 5,837,216.

[30] Foreign Application Priority Data

Feb. 28, 1996 [DE] Germany .......................... 196 07 456

[51] Int. Cl.⁷ .............................. C01G 49/02; C09C 1/22
[52] U.S. Cl. ..................... 423/632; 106/456; 423/633; 423/634
[58] Field of Search ............................ 106/456; 423/632, 423/633, 634

[56] References Cited

U.S. PATENT DOCUMENTS

| | | | |
|---|---|---|---|
| 1,327,061 | 1/1920 | Penniman, Jr. et al. | 423/632 |
| 1,368,748 | 2/1921 | Penniman, Jr. et al. | 423/632 |
| 1,542,968 | 6/1925 | Snellenberger | 423/632 |
| 2,388,659 | 11/1945 | Ryan et al. | 23/230 |
| 3,755,554 | 8/1973 | Lailach et al. | 423/633 |
| 4,234,348 | 11/1980 | Brunn et al. | 106/304 |
| 4,432,803 | 2/1984 | Hitzrot, Jr. | 106/304 |
| 4,966,641 | 10/1990 | Westerhaus et al. | 106/456 |
| 5,837,216 | 11/1998 | Burow et al. | 423/632 |

FOREIGN PATENT DOCUMENTS

| | | |
|---|---|---|
| 143 517 | 7/1903 | Germany . |
| 463 773 | 5/1925 | Germany . |
| 464 561 | 5/1925 | Germany . |
| 515 758 | 8/1925 | Germany . |
| 1 084 405 | 6/1960 | Germany . |
| 1 191 063 | 4/1965 | Germany . |
| 20 29 300 | 12/1971 | Germany . |
| 24 14 805 | 10/1975 | Germany . |
| 36 20 333 | 12/1987 | Germany . |
| 1 226 876 | 3/1971 | United Kingdom . |

OTHER PUBLICATIONS

Ullmann's Encyclopedia of Industrial Chemistry, *Pigments, Inorganic*, vol. A20, pp. 298–299, 1992.
Ullmann's Encyclopedia of Industrial Chemistry, *Pigments, Inorganic*, vol. A20, pp. 243, 301–303, 362–363, 1992.

*Primary Examiner*—C. Melissa Koslow
*Attorney, Agent, or Firm*—Connolly & Hutz

[57] ABSTRACT

The invention relates to the use of synthetic (synthetically produced) iron raw materials to prepare iron oxide pigments in the Penniman process and other iron-dissolution processes.

9 Claims, 2 Drawing Sheets

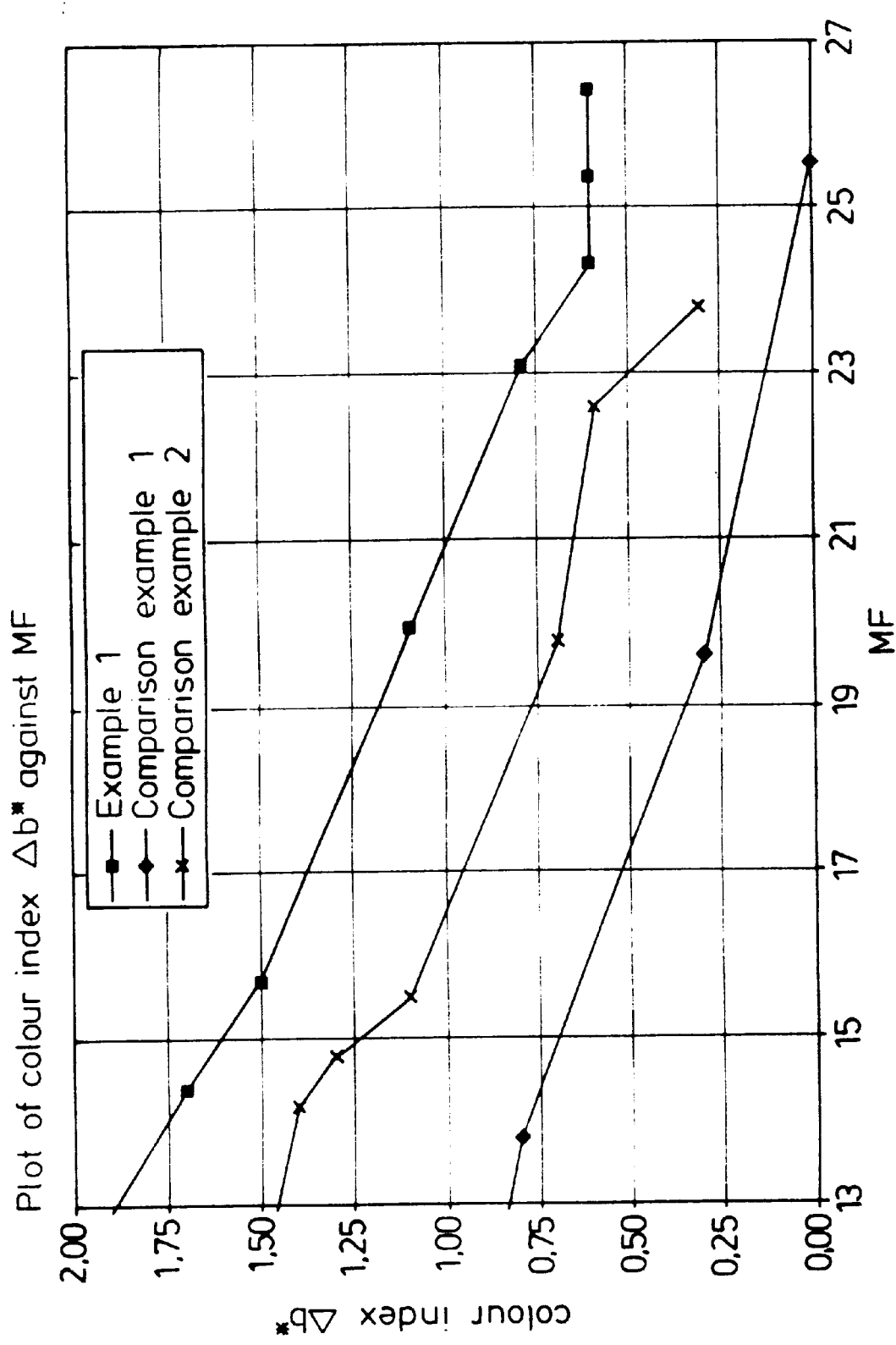

USE OF SYNTHETIC, IRON RAW MATERIALS FOR PREPARING IRON OXIDE PIGMENTS

CROSS-REFERENCE TO RELATED APPLICATION

The present application is a continuation of U.S. patent application Ser. No. 08/805,223 filed on Feb. 24, 1997, now U.S. Pat. No. 5,837,216.

The invention relates to the use of synthetic (synthetically produced) iron raw materials for preparing iron oxide pigments in the Penniman and other iron-dissolution processes.

Iron oxide coloured pigments, which are used as ecologically harmless colorants in ceramics, building materials, plastic materials, lacquers and paper, may basically be obtained in black, yellow, red and brown shades.

Iron oxide pigments are obtained, as described in Ullmann's Encyclopedia of Industrial Chemistry, VCH, Weinheim 1992, vol. A20, p. 298 et seq., by solid phase reactions (red, brown and black pigments), precipitation and hydrolysis reactions of iron salts (yellow, red, orange and black pigments) and by the oxidation of iron with aromatic nitro compounds in the presence of hydrolysable, multi-valent salts (Laux process: DE-A 463 773, DE-A 515 758).

Solid phase reactions are mainly used for the production of red iron oxides from black precursors (by calcination) or from $FeSO_4$ (Copperas process). Black precursors are produced by precipitation from solutions of iron salts or by the Laux process. The production of iron oxide red pigments by roasting iron sulphate is an industrially complicated process which is associated with several washing stages performed in sequence, in which effluents which contain heavy metal are produced.

The production of yellow, orange, red and black iron oxide pigments using precipitation (e.g. U.S. Pat. No. 2,388,659 for iron oxide yellow pigments) from solutions of iron salts and alkaline compounds in the presence of air is associated with the disadvantage that stoichiometric amounts of neutral salts are produced, which appear in the effluent or have to be worked up in a time-consuming and costly manner.

The Penniman process (U.S. Pat. No. 1,327,061 and U.S. Pat. No. 1,368,748) reduces the amount of neutral salts which arises during the precipitation process by using metallic iron as the raw material, this being dissolved during the process by the acids being released.

The Laux process represents conversion of the well-known Bechamp reaction to an industrial scale. By reducing aromatic nitro compounds with metallic iron raw materials, the iron oxide arising in addition to the aromatic amino compound, as an inevitable consequence of the reaction, is obtained in pigment quality by means of appropriate reaction management. The Laux process is a cost-effective and ecologically harmless process for producing iron oxide pigments because, due to the use of metallic iron raw materials, no bases are required to precipitate the iron oxide and therefore no neutral salts which have to be disposed of are produced as by-products.

The Penniman and Laux processes therefore provide two cost-effective, ecologically harmless processes which use metallic iron as a raw material for the direct production of iron oxide pigments.

The raw materials for these two processes are by-products from other industrial sectors; pickling liquors from the steel industry or iron sulphate from $TiO_2$ production are used as solutions of iron salts (e.g. $FeCl_2$, $FeSO_4$). The metallic iron raw materials are, in all cases, secondary raw materials from the metal processing industry (scrap metal). Depending on the requirements for the process selected, this scrap metal may be in the form of punched-out shapes, the tips of pins or nails, sheet metal, bundles or turnings.

The use of this scrap metal to produce iron oxide pigments has several disadvantages because it is not a well-defined raw material. The chemical composition of the scrap metal and also its reactivity in the processes may vary considerably.

It has therefore been suggested that the lack of and variations in quality associated with secondary raw materials be eliminated by the use of synthetically produced (synthetic) iron raw materials. Synthetically produced iron raw materials are, for instance:

pig iron cast iron specular pig iron steels iron/steel powder.

In this case it is sensible, for economic reasons, to use only those iron raw materials which are produced in large amounts for other industrial sectors and are therefore available in sufficient amounts.

The synthetic iron raw materials selected should have the following set of properties:

1. suitable conveyance characteristics
2. ability to be metered out easily
3. complete dissolution during the process
4. low concentrations of doped and foreign metals
5. dissolution properties which are appropriate for the process and the reaction.

Since synthetic iron raw materials are available in the form of discrete lumps (blocks, rods, billets, pigs, slabs, etc) or very finely divided (powders) or, for quality reasons, are alloyed, the use of commercially available, synthetic iron raw materials in iron-dissolution processes for producing iron oxide pigments has not hitherto been disclosed. Lumps of synthetic iron raw material are complicated to convey and to meter; in addition lumps of synthetic iron raw material dissolve only very slowly and incompletely in the iron-dissolution processes used for pigment production. The foreign metal content of these iron raw materials, depending on the field of use in the further processing industrial sector, can vary greatly. Depending on the particular field of use, chromium, molybdenum, vanadium and/or nickel contents of greater than 15 wt. % may be present.

Iron powder is easy to convey and meter out. Depending on the field of application, however, high concentrations of foreign metals may be present in iron powders. Although iron powder dissolves completely during the course of iron-dissolution pigment-producing processes, due to its reaction characteristics, no iron oxide particles with a pigment character are formed in iron-dissolution processes when using powders to produce iron oxide pigments, as a result of the high reactivity. The particles obtained have an unsuitable size and size distribution and generally do not consist of a single phase.

Alloyed, synthetic iron raw materials, apart from inadequate reactivity in iron-dissolution processes, have the disadvantage that the alloying elements are incorporated in the iron oxide particles. The incorporation of heavy metals, (e.g. Cr, Mo, V, Ni, Cu, etc) is associated with a decrease in the coloristic properties of the pigments obtained and is also ecologically harmful.

Therefore no synthetic iron raw materials have hitherto been used in iron-dissolution processes, such as e.g. the Penniman process, for preparing iron oxide pigments.

The problem was, therefore, to provide iron raw materials for preparing iron oxide pigments in iron-dissolution processes which do not have the disadvantages of the prior art (inadequate metering and conveyance behaviour, incomplete dissolution, heavy metal contents, low space-time yields).

Surprisingly, it was found that specific, synthetic iron raw materials, in fact low-alloyed, spherical, approximately isometric, optionally globular or ellipsoid, iron particles, which, inter alia, are used as blasting agents, are suitable for producing iron oxide pigments in iron-dissolution processes and that they have advantages over both secondary raw materials and also other synthetic iron raw materials.

BRIEF DESCRIPTION OF THE DRAWINGS

FIG. 2 is a plot of colour index Δb* versus MF for Example 1, Comparison Example 1 and Comparison Example 2.

Figure 1:
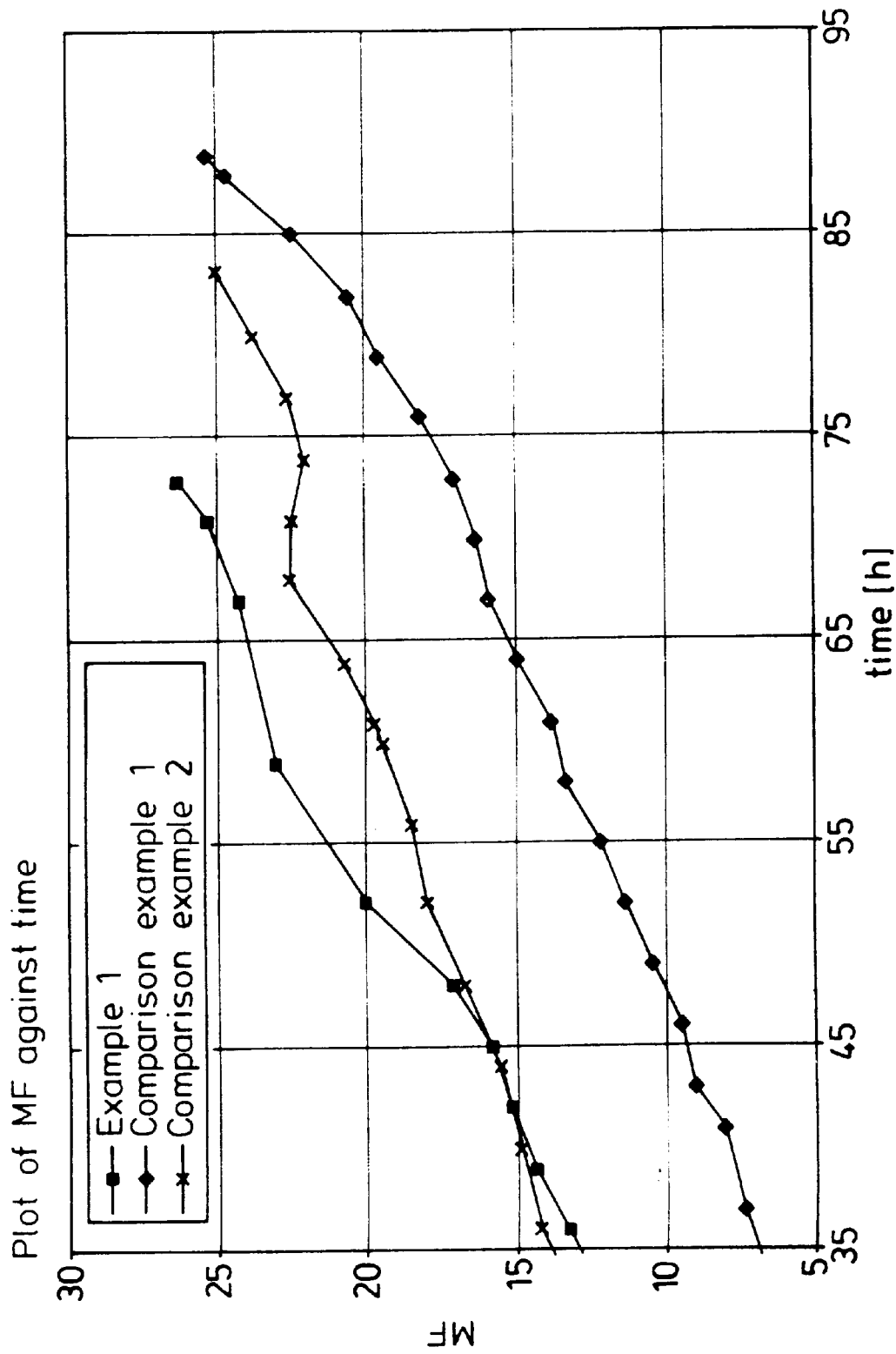
FIG. 1 is a plot of MF versus run time for Example 1, Comparison Example 1 and Comparison Example 2.

The invention provides the use of synthetic iron raw materials with an average particle size between 0.5 and 100 mm, with a metallic iron content greater than 80 wt. % for preparing iron oxide pigments in iron-dissolution processes whereby the iron raw materials are reacted with oxidizing agents (e.g. air, oxygen or aromatic nitro compounds (nitrobenzene)) to form iron oxides or iron hydroxides or mixtures thereof in an acidic aqueous solution.

Spherical synthetic iron raw materials are particularly preferred.

The average particle size of the synthetic iron raw material is preferably between 0.5 and 50 mm or between 20 and 100 mm (e.g. sponge iron).

The metallic iron content of the synthetic iron raw material is preferably greater than 85 wt. %, in particular greater than 90 wt. % and specifically greater than 95 wt. %.

The foreign metal content of the synthetic iron raw material is preferably less than 15 wt. %, in particular less than 10 wt. %, specifically less than 7 wt. % and most preferably 3 wt. %.

In general the synthetic iron raw materials, depending on the eventual application, are doped with the following foreign elements: Si, C, Cr, Ni, V, Mo, Cu, W, Ti, P, N, Co. These foreign metals may also combine with the iron (e.g. C as $Fe_3C$, cementite) and thus bond the iron.

The remainder (up to 100 wt. %) of the synthetic iron raw material, which is not present as metallic iron, iron-containing compound or foreign metal, may consist of iron oxides of various compositions (e.g. $FeO$, $Fe_2O_3$, $Fe_3O_4$).

The preferred, synthetic iron raw materials are characterised by the following properties:
1. average particle size: 0.5–100 mm
2. particle size distribution: 80 wt. % of the particles are between one quarter and four times the mean value
3. metallic iron content: >80 wt. %
4. foreign metal content: <15 wt. %

Preferred synthetic iron raw materials have the following, beneficial properties:
1. They are easy to convey.
2. They are easy to meter out.
3. They dissolve almost completely in iron-dissolution pigment-producing processes.
4. They have low foreign metal contents.
5. Their reaction characteristics are appropriate for pigment-producing processes.

Surprisingly, the reaction characteristics of the preferred iron raw material is superior to the secondary raw materials used hitherto. At the same time, products with very favourable pigment properties are obtained, with improved space-time yields, in the Penniman and Laux processes. Yellow pigments obtained in this way (see examples), for instance, exhibit advantages in the mass tone lacquer test, with regard to the CIELAB colour index b* which is a measure of the quality-determining yellow fraction of the shade, as compared with those which have conventionally been produced.

Masstone determination of the colour index for the pigments prepared using synthetic raw materials and for the pigments from the comparison examples is performed in L 64 thixotropic paste (unhardened alkyd resin from Bayer AG) at a pigment volume concentration of 10%. Incorporation of the pigment into the paste is performed on a disc colour rubbing-in machine with a 240 mm diameter with an applied load of 25 kg. Pigment and paste are dispersed during 100 revolutions of the disc colour rubbing-in machine, during which time the apparatus is opened up and the mixture collected together several times.

Colour evaluation of the pigments obtained according to the invention is performed in Alkydal L 64 thixotropic paste (unhardened alkyd resin from Bayer AG) at a pigment volume concentration of 10%. The resulting pigmented paste is then analysed in a commercially available color analysing device of d/8° geometry (Ulbricht sphere). The reflection factors obtained are converted into the CIELAB color data system by the standard method in accordance with ASTM E 308-85 and DIN 6174 (ISO 7724/3, 1984; ASTM D 2244-85) using a C/2° standard illuminant, with the inclusion of surface reflection, C* being defined as the square root of the sum of the squares of a* and b* [$C^* = (a^{*2}+b^{*2})^{1/2}$]. The relative colour differences can be determined according to DIN 6174 or ISO 7724 drafts 1–3, by comparing a sample with a designated reference substance.

The relative colour differences of the pigment samples are calculated according to DIN 6174 (ISO 7724) against a reference material prepared using conventional secondary raw materials.

The metallic iron content of the iron raw material used is determined using the hydrogen method:

1. Equipment

Gas generator: 250 ml round-bottomed flask, 50 ml measuring dropping funnel with gas take-off pipe and gas cap for nitrogen feed-line, 1000 ml gas collecting vessel (measuring dropping funnel) with graduations and tap, vacuum connection, pneumatic tank (31) with thermometer, 500 ml measuring cylinder, heating mantle for 250 ml round-bottomed flask.

2. Method

A pneumatic tank is filled with water. About 2 g of the sample of synthetic iron raw material to be determined is weighed into a 250 ml round-bottomed flask. After adding 250 ml of distilled water, the round-bottomed flask is placed in the heating mantle and a measuring dropping funnel with gas take-off pipe is inserted. The contents of the round-bottomed flask are heated to boiling point and maintained at that temperature. As soon as no more gas bubbles escape at the tip of the gas take-off pipe, 40 ml of dilute hydrochloric acid (about 10% strength) is placed in the dropping funnel, the dropping funnel is sealed with a gas cap and the gas take-off pipe is introduced, from underneath, into the gas collecting vessel. The end of the nitrogen pipe is pushed into a 500 ml measuring cylinder which is about ⅔ full of water, so that a counter-pressure is thereby produced. The gas collecting vessel is completely filled with water by applying a vacuum. The hydrochloric acid is added dropwise to the round-bottomed flask. The solution in the round-bottomed flask is heated so that it boils gently, until the evolution of hydrogen has terminated.

3. Experimental Values Which Are Measured

Volume of the water displaced in the gas collecting vessel (V)

Difference between level of water in the gas collecting vessel and in the tank (h)

Temperature of water ($T_w$)

Room temperature (T)

Air pressure ($P_{air}$)

4. Calculation

Pressure (P)=$P_{air}-P_{hydrostat}-P_{H2O}$ $P_{air}$=air pressure; $P_{hydrostat}$=h×0.0736 (hydrostatic pressure)

$P_{H2O}$=pressure of water vapour (see tabulated data)

normalised volume (V°): P×V×273/R×T×760

Content ($Fe_{met.}$): 2.000 g weighed out corresponds to 803.3 ml of hydrogen (for 100% metallic iron) metallic iron content in the sample of synthetic iron raw material:

$Fe_{met.}$=V°×100/803.3×(weight of sample/2)

The invention will be explained in more detail by means of the following examples. The examples are intended as an illustration of the use of synthetic raw materials in pigment preparing processes which are known per se and do not represent any restriction. The following describes the production of iron oxide yellow pigments which are produced under conditions known to a person skilled in the art (pH<4.5) in iron-dissolution processes (Penniman and/or Laux process). The phase formation of iron oxide pigments in iron-dissolution processes is pH-controlled, in the acid pH region (<4.5), α-FeOOH is formed, in the weakly acid region (about 4.5–5.5), γ-FeOOH and α-$Fe_2O_3$ are produced and in the pH region >5, the formation of $Fe_3O_4$ is preferred, wherein it is left to a person skilled in the art to decide the precise conditions under which γ-FeOOH, α-$Fe_2O_3$ or $Fe_3O_4$ are produced when using the synthetic iron raw materials.

Penniman Process

1. Description of the Equipment 9.2 l stainless steel pot with a gas distribution ring located just above the base, a vane stirrer, a control thermoelement, a pH electrode, a glass lid and a reflux condenser.

2. Description of Nucleation

Enough 25% strength caustic soda solution is added with stirring to an aqueous solution of iron(II) sulphate with 150 g/l of $FeSO_4$ for 40% of the iron to be precipitated as iron(II) hydroxide. By aerating with air at 35° C., Fe(II) is oxidised to Fe(III); the pH then falling from 7 to 3.

3. Description of the Pigment Build-up Reaction

Nuclei used: α-FeOOH with a specific surface area of 59 $m^2/g$. 9 l of nucleus-suspension with a concentration of 7.0 g/l of α-FeOOH and a $FeSO_4$ content of 40 g/l, as well as 650 g of metallic iron raw material, are initially introduced. The suspension is heated to 85° C. with stirring at 200 rpm and then aerated with 200 l/h of air with further stirring. After specific oxidation times, samples of on average 250 ml are withdrawn. Reaction is terminated after 82 hours.

The α-FeOOH content of the samples is determined. From the α-FeOOH content after specific oxidation times and the α-FeOOH nucleus content used, the multiplication factor MF is calculated in accordance with the following equation:

MF=α-FeOOH content (of sample)/α-FeOOH content (of nuclei)

The following Table characterises the metallic, spherical iron raw materials used in the examples:

TABLE 1

Characteristics of the metallic, spherical iron raw materials

| | Shape | Particle sizes | Metallic iron | Foreign metal content |
|---|---|---|---|---|
| Comparison example 1 | Irregularly shaped bits of sheet metal | Area: 10–50 $cm^2$ Thickness: 1–3 mm | 98% | <10% |
| Comparison example 2 | Irregularly shaped bits of sheet metal | Area: 10–50 $cm^2$ Thickness: 0.3 mm | 94% | <10% |
| Example 1 | globular and ellipsoidal | 0.25–4 mm | 95% | <10% |

The run times for sample withdrawal, the multiplication factors (MF) and the CIELAB colour index Δb* measured are listed in the following Table for the individual examples. The reference material used was the pigment built up in the same way as the pigments prepared according to the invention (MF=25.5), but which had been obtained using conventional raw materials.

The samples are filtered by conventional methods, washed salt-free and dried for 15 hours at 90° C. in a drying cabinet. Then the CIELAB colour indices are determined in accordance with the methods given above.

TABLE 2

Run times, MF and CIELAB color index Δb* for comparison examples 1 and 2 and example 1.

| Comparison run time [h] | example 1 MF | Δb* | Comparison run time [h] | example 2 MP | Δb* |
|---|---|---|---|---|---|
| 37 | 7.4 | | 36 | 14.2 | 1.4 |
| 43 | 9.0 | | 40 | 14.8 | 1.3 |
| 46 | 9.5 | 0.8 | 44 | 15.5 | 1.1 |
| 61 | 13.8 | 0.8 | 61 | 19.8 | 0.7 |
| 79 | 19.6 | 0.3 | 68 | 22.6 | 0.6 |
| 89 | 25.5 | 0.0+ | 80 | 23.8 | 0.5 |

| Run time [h] | Example 1 MF | Δb* |
|---|---|---|
| 39 | 14.4 | 1.7 |
| 45 | 15.7 | 1.5 |
| 52 | 20.0 | 1.1 |
| 59 | 23.1 | 0.8 |
| 67 | 24.3 | 0.6 |
| 71 | 25.4 | 0.6 |
| 73 | 26.4 | 0.6 |

+= reference material

FIGS. 1 (MF against run time) and 2 (Δb* against MF) show that the synthetic, metallic iron raw material has advantages over the prior art (conventional scrap sheet metal) with regard to space-time yields and also, at comparable space time yields, over scrap sheet metal with regard to the quality-relevant CIELAB colour index b*.

Laux Process

The use of synthetic iron raw materials for producing iron oxide yellow pigments by the Laux process is described by way of example in the following examples, wherein a person skilled in the art may vary the selection of industrial aggregates or additional feedstocks, depending on requirements. Iron oxide pigments which are obtained by the reaction of metallic iron raw materials with nitrobenzene are prepared in accordance with the Laux process which is described in U.S. Pat Nos. DE 463,773, DE 464,561, DE 515,758 and 4,234,348 (Ullmann's Encyclopedia of Industrial Chemistry Vol A20, p. 301–303 and 362, 1962), the complete disclosures of which are expressly incorporated herein by reference. By varying the additional feedstocks, a person skilled in the art can specifically prepare any of the iron oxide phases obtainable in the Laux process ($\alpha$-FeOOH, $\gamma$-Fe$_2$O$_3$, $\alpha$-Fe$_2$O$_3$ or Fe$_3$O$_4$), as is generally known. Using the process described in the Patents, the following substances are converted in pressure-resistant tanks fitted with stirrers.

TABLE 4

Substances and process parameters for comparison example 3 and example 2 (size of tank: 2 liters)

| Parameter | | Comp. example 3 | Example 2 |
|---|---|---|---|
| 1st phase | FeCl$_2$ solution [l] | 0.12 | 0.124 |
| | H$_2$O [l] | 0.05 | 0.046 |
| | AlCl$_3$ (160 g/l) [l] | 0.055 | 0.055 |
| | metallic iron raw material [kg] | 0.08 | 0.08 |
| | Nitrobenzene [l] | 0.095 | 0.095 |
| 2nd phase | metallic iron raw material [kg] | 0.352 | 0.568 |
| | Nitrobenzene [l] | 0.240 | 0.408 |
| | H$_2$O [l] | 0.6 | 0.6 |
| | Run time up to 100% conversion [h] | 7 | 6 |

The metallic iron raw materials used in the examples are characterized in the following table.

TABLE 5

Characteristics of the metallic iron raw materials used

| | Shape | Particle sizes | Metallic iron | Foreign metal content |
|---|---|---|---|---|
| Comparison example 3 | Pin and nail-shaped lumps of metal | Length: 10–50 mm Thickness: 0.5–1 mm | 98% | <10% |
| Example 2 | globular and ellipsoidal | 0.25–4 mm | 95% | <10% |

Working Up the Samples

In a 300 ml beaker, 50 ml of freshly distilled aniline is added to about 200–250 g of pigment paste, stirred with a paste spoon and then the aniline is decanted off. The process is repeated until the aniline is clear and colourless after being stirred into the paste. Then the washed paste is transferred to a 2 liter wide-necked flask and slurried with drinking water, with vigorous shaking. To separate excess iron and the coarse fraction, the suspension is passed through a 40 $\mu$m sieve. The suspension obtained is filtered under vacuum through a Buchner filter which is lined with filter paper. As soon as the suspension has been suction filtered, about 3–4 portions of 250 ml of drinking water are poured in sequence over the paste on the filter in order to wash out salts.

The sludge-like pigment paste is dried for 1 hour at 170° C. in a drying cabinet. The dried pigment is brushed through a 9 mesh sieve and then incorporated into the binder system (L 64 thix. see above).

The pigment which was obtained by using conventional secondary raw materials was used as the reference material.

TABLE 6

Run times up to 100% nitrobenzene conversion and CIELAB color index $\Delta b^*$ for comparison example 3 and example 2

| | Run times to 100% nitrobenzene conversion [h] | Weight of pigment obtained [g] | Space-time yield [g/l.h] | CIELAB color index $\Delta b^*$ |
|---|---|---|---|---|
| Comp. example 3 | 7 | 563 | 40.2 | 0.0+ (+ = ref. mat.) |
| Example 2 | 6 | 845 | 70.4 | 9.0 |

The results which are given in Table 6 show that the use of synthetic metallic iron raw materials in the Laux process also has advantages over the use of conventionally used raw materials, these being linked to the space-time yield and also to the quality-determining CIELAB colour index b*.

What is claimed is:

1. A method of using synthetic iron raw materials consisting essentially of spherical iron particles with an average particle size between 0.5 and 100 mm and a metallic iron content greater than 80 wt. % to prepare iron oxide pigments in iron-dissolution processes, wherein said method comprises reacting said iron raw materials with oxidizing agents to form iron oxides or iron hydroxides or mixtures thereof in an acidic aqueous solution.

2. A method according to claim 1, wherein said iron raw material has an average particle size of between 0.5 mm and 50 mm.

3. A method according to claim 1, wherein said iron raw material has a metallic iron content of greater than 85 wt. %.

4. A method according to claim 1, wherein said iron raw material has a metallic iron content of greater than 90 wt. %.

5. A method according to claim 1, wherein said iron raw material has a metallic iron content of greater than 95 wt. %.

6. A method according to claim 1, wherein said iron raw material has a foreign metal content of less than 15 wt. %.

7. A method according to claim 1, wherein said iron raw material has a foreign metal content of less than 10 wt. %.

8. A method according to claim 1, wherein said iron raw material has a foreign metal content of less than 7 wt. %.

9. A method according to claim 1, wherein said iron raw material has a foreign metal content of less than 3 wt. %.

* * * * *